United States Patent [19]

Heinz

[11] 4,202,605
[45] May 13, 1980

[54] ACTIVE SEGMENTED MIRROR

[75] Inventor: Theodore A. Heinz, Moorpark, Calif.

[73] Assignee: Rockwell International Corporation, El Segundo, Calif.

[21] Appl. No.: 27,208

[22] Filed: Apr. 5, 1979

[51] Int. Cl.² .............................................. G02B 7/18
[52] U.S. Cl. .................................... 350/292; 350/310
[58] Field of Search ..................... 350/292, 310, 295

[56] References Cited

U.S. PATENT DOCUMENTS

| | | | |
|---|---|---|---|
| 3,261,016 | 7/1966 | Burr | 350/310 |
| 3,401,390 | 9/1968 | Braccini et al. | 350/292 |
| 3,503,004 | 3/1970 | Haisma et al. | 350/310 |
| 3,620,606 | 11/1971 | Tschunko | 350/310 |
| 3,904,274 | 9/1975 | Feinleib et al. | 350/295 |
| 3,932,029 | 1/1976 | Weiss | 350/310 |

FOREIGN PATENT DOCUMENTS 7702462  9/1978  France ........................... 350/295

Primary Examiner—Jon W. Henry
Attorney, Agent, or Firm—L. Lee Humphries; Harry B. Field

[57] ABSTRACT

An active segmented mirror comprises a plurality of mirror elements connected through a common substrate. Each of said elements comprises a cooled hexagonal mirror substrate, a compliant joint connecting the mirror substrate with the supporting structure, a strut connecting the substrate and actuator and capable of carrying a coolant, and a piezo ceramic actuator assembly.

11 Claims, 5 Drawing Figures

VIEW A-A

ACTIVE SEGMENTED MIRROR

BACKGROUND OF THE INVENTION

1. Field of the Invention

This invention relates to deformable mirror systems, and more specifically to active segmented mirrors for use in the laser field.

2. Description of the Prior Art

In accordance with the present invention there is provided an active segmented mirror which has a plurality of performance and fabrication advantage over the prior art. First, operating bandwidths are not affected by mirror surface heat exchanger stresses or restraints. Low elastic stresses are maintained in all components even with extreme heat loads and operating frequencies and deflections. Operating bandwidth and life are basically restricted only by actuator capability offering ready growth to futuristic requirements with minimum design change. Mechanical resonances are characteristically several kHz, making high frequency, large amplitude operation practical.

Mirror size is relatively independent of heat exchanger induced distortion providing extension to very large mirrors with minimum design and fabrication impact. Larger or smaller mirrors may be obtained by changing the supporting structure and manifolding. Scaling of elements from $\frac{1}{2} \times$ to $2 \times$ also appears practical, providing a range of corrector precision to satisfy system performance and control requirements.

The elements in the proposed mirror can be polished in groups mounted in a rigid support structure. The ability to polish flat mirrors while maintaining figures to within 0.002 inch of the edge has been demonstrated. The individual segments are coated after polishing. The total mirror is assembled after the surface finishing operations. Assembly tolerances are relaxed by the ability to adjust and trim segments mechanically during assembly. This trimming feature may also be used to make static optical figure changes.

Figure stability is improved since thermal expansion of heat exchanger elements does not affect the overall structure. The inherent rigidity of the mirror components also aids stability when subjected to acoustic, vibration, and maneuvering loads. Since large forces are available in the actuators, the segment suspension sections may be designed to be quite rigid when viewed by environmental disturbances, yet sufficiently compliant to permit wide band operation.

Control is simplified, as motion of a segment is not influenced by loads transmitted or induced by adjacent sections of the mirror. The surface is also free of complex resonance variations arising from physical structure changes caused by deflection of adjacent sections.

Reliability is improved by the simplicity and independence of the proposed segment configuration. Each segment may be tested and inspected independently before assembly. Should failure occur, its effect is minimized and repair is readily accomplished by segment replacement. By employing proper techniques, an actuator or mirror segment or both may be replaced without disturbing the remaining assembly.

Alignment and trimming of individual sections of the mirror is simplified since adjustment of one segment does not affect position of adjacent sections as occurs when loads are transmitted through common compliant structure.

Thermal management of actuator components as required to ensure stability is simplified by their isolated position behind energy absorbing structure. The actuators are cooled by conduction both into the strut and support structure.

The small size and accessibility of the individual segments permits a great deal of latitude in heat exchanger design. Since gross mirror distortion caused by thermally induced bending is basically a function of the diameter of the mirror squared, the small size of the segment permits relatively simple coolant circuits to be used as compared with larger mirrors. The small segments are also more readily adapted to advanced fabrication techniques.

SUMMARY OF THE INVENTION

Accordingly, the active segmented mirror of the present invention comprises a plurality of hexogonal mirror elements. Each element is connected to an independent piezo ceramic actuator assembly providing dynamic positioning through tip, tilt and in-plane translation of the mirror surface. A mirror of any given size is achieved by combining the required number of elements together on a common supporting structure. When used with a suitable wavefront analyzer and servo control amplifier system, the mirror thus formed provides a means of making both static and dynamic three-dimensional wavefront corrections at required amplitudes, small multiples of wave length, and frequencies of several thousand hz. Depending upon atmospheric conditions, power on target may be increased several times by utilizing this invention, thus providing a significant advantage in system design and vehicle capability. Each mirror element assembly comprises a cooled hexagonal mirror element, a compliant joint connecting the mirror element with the supporting structure, a strut connecting the element and actuator, and a piezo actuator assembly,

OBJECTS OF THE INVENTION

Therefore, it is an object of the present invention to provide an active segmented mirror wherein operating bandwidths are not affected by mirror surface heat exchanger stresses or restraints.

Another object of the present invention is to provide an active segmented mirror wherein low-elastic stresses are maintained in all components even with extreme heat loads and operating frequencies and deflections.

Yet another object of the present invention is to provide an active segmented mirror wherein operating bandwidth and life are basically restricted only by actuator capability offering ready growth to futuristic requirements with minimum design change.

Still another object of the present invention is to provide an active segmented mirror wherein mechanical resonances are characteristically several kHz, making high frequency, large amplitude operation practical.

Other objects, advantages, and novel features of the present invention will become apparent from the following detailed description of the invention when considered in conjunction with the accompanying drawings, in which like reference numerals designate like parts throughout the figures.

DESCRIPTION OF THE PREFERRED EMBODIMENTS

Figure 1:
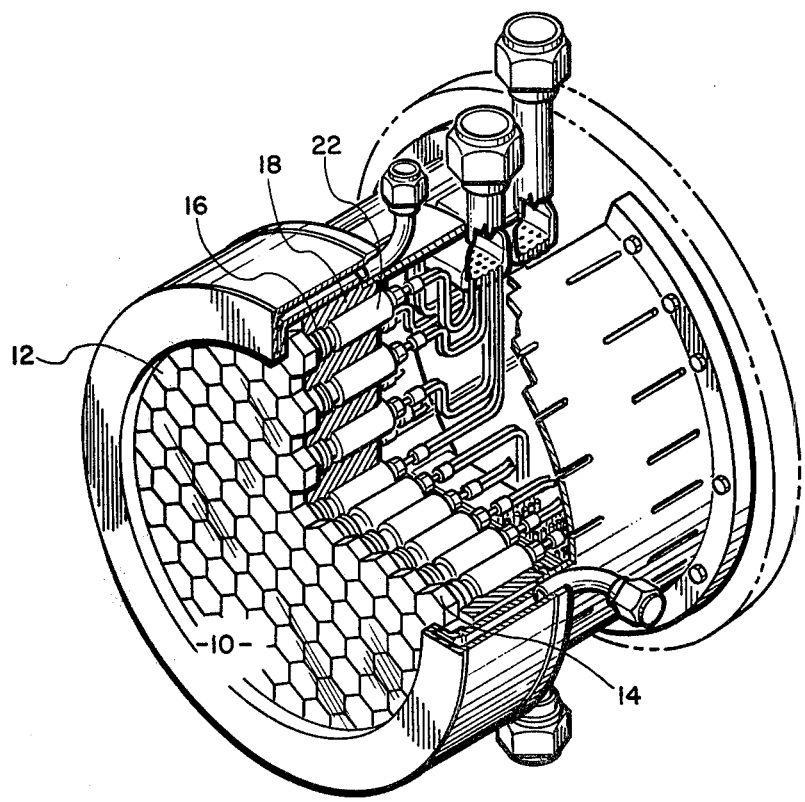
FIG. 1 is a cutaway prospectus view of the segmented corrector mirror.
Figure 2:
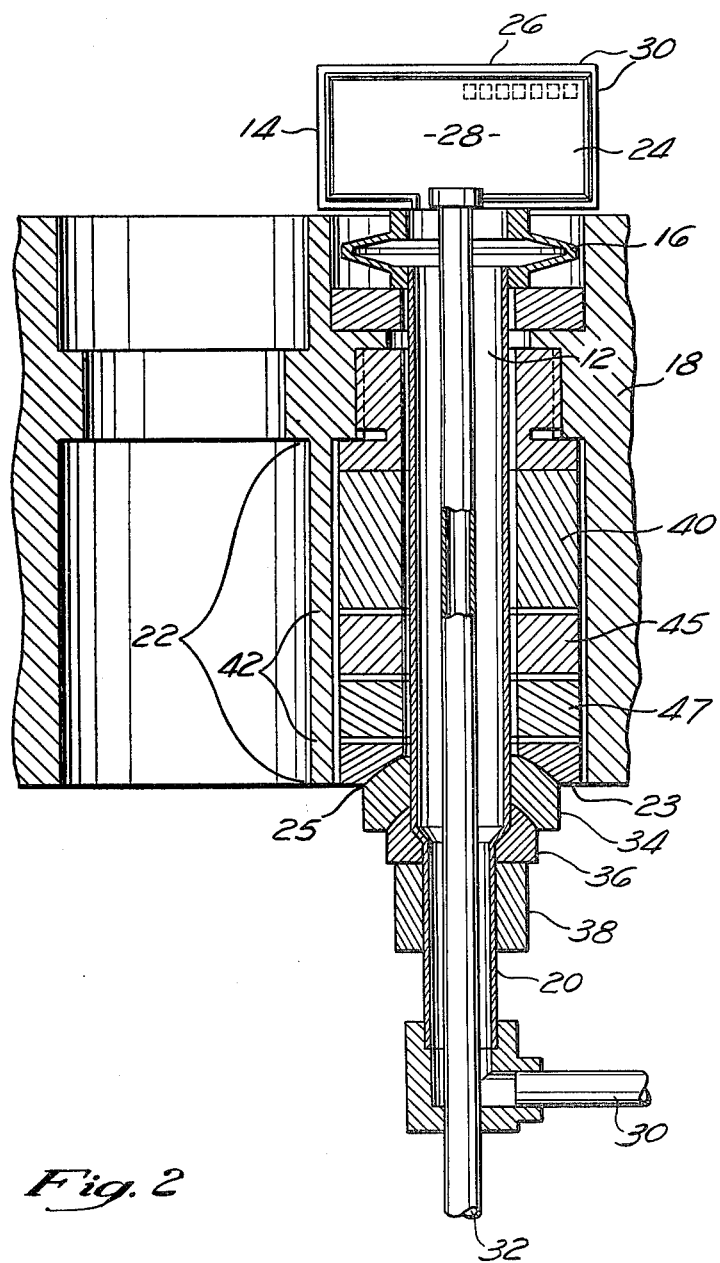
FIG. 2 is a cutaway view of a mirror element.

Referring now to FIGS. 1 and 2, there is shown the preferred configuration of an active segmented mirror 10 which comprises a closely packed hexagonal, high-power segmented array of mirror element assemblies 12. Each mirror element assembly 12 comprises a mirror element 14, a compliant joint 16 for connecting the mirror element 14 with a support structure 18, and strut 20 which provides a coolant inlet and outlet and connects the mirror element 14 with actuator assembly 22. The aft end 23 of each actuator assembly 22 may be caused to move independently in three orthogonal axes by virtue of its unique construction shown in FIGS. 3a, 3b, and 3c. This tip, tilt and planar motion is translated to the mirror substrate 26 by strut 20 fixed to the aft side of the mirror element 14 and preloaded against the aft end 23 of the actuator 22 through a ball-mount type mechanism 25.

Each mirror element 14 is made up of mirror surface 26 and mirror substrate 24. The mirror substrate 24 comprises a machined body 28 containing cooling passages 30, and distribution manifolds described in U.S. Pat. No. 3,884,558 to Dunn et al included herein by reference, and the upper half of a compliant joint 16. The coolant passages 30 provide thermal management of power absorbed between the elements 12 (approximately 0.5% of incident value) and power absorbed on the mirror surface 26 (approximately 1% of incident value). Manifold and coolant passage closeouts can be formed by a 0.005-inch-thick layer of metal applied by electrodeposition, electroless plating, vapor deposition utilizing common techniques, as well as any other standard techniques. In a preferred embodiment, coolant passages 30 are high-velocity coolant passages and they are located on all sides of the mirror element 14 as well as at the optical surface. By so positioning these coolant passages 30, energy entering the gaps between mirror elements 14 will be readily absorbed.

Each mirror surface 26 may be lapped and polished individually to a contour determined by the final composite optical figure desired. This feature has a significant advantage in reducing the cost of optical-finishing large mirrors. Furthermore, an energy-absorbing cooled mask of welded, black anodized aluminum construction can be added to protect the edges of the mirror element 14 from stray radiation.

Although the mirror element 14 shown in the FIGS. is hexagonal, any other regular planar geometric shape, such as a square, or octagon, which will allow a tightly-packed array will be capable of performing the desired task to a greater or lesser degree.

Figure 3A:
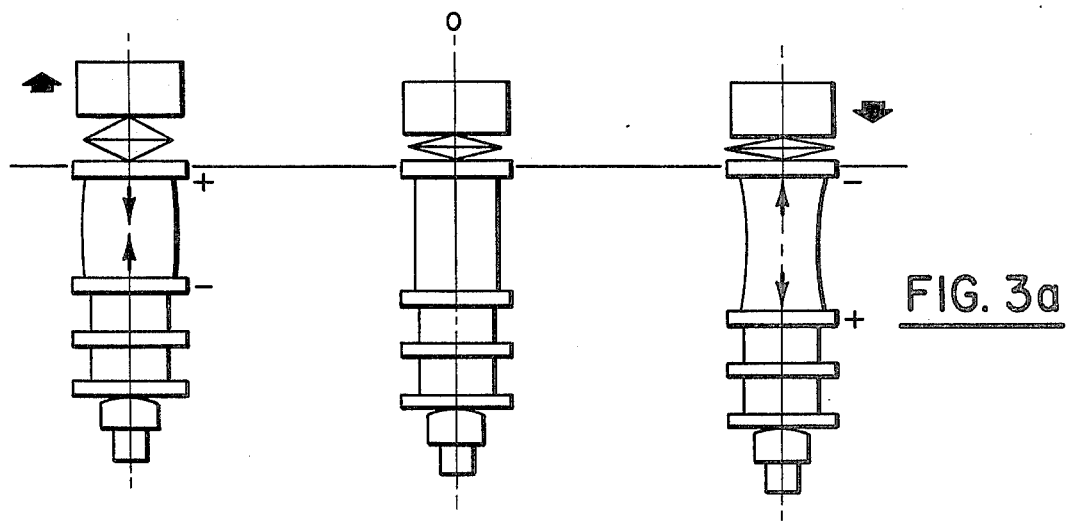
FIG. 3a is a diagrammatical representation of a mirror element showing in-plane motion.
Figure 3B:
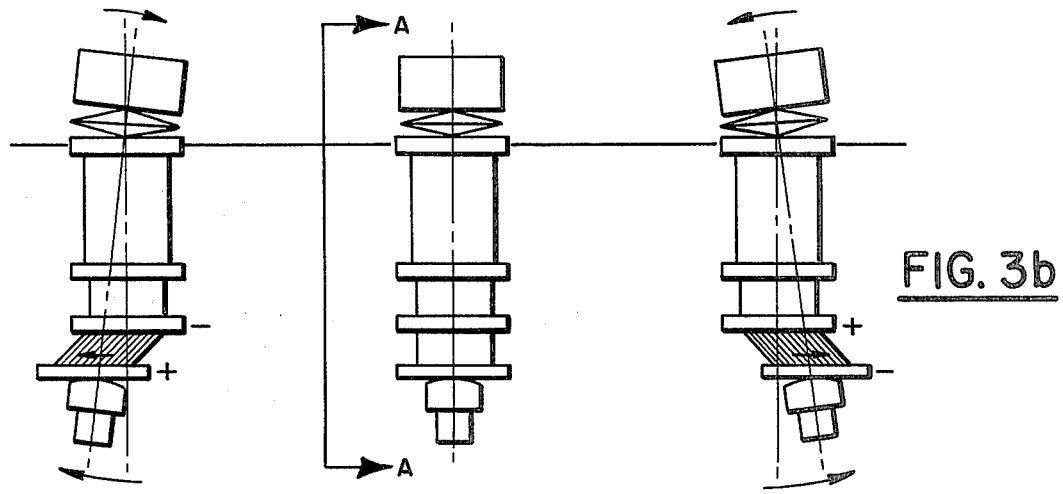
FIG. 3b is a diagrammatical representation of a mirror element showing tip motion.
Figure 3C:
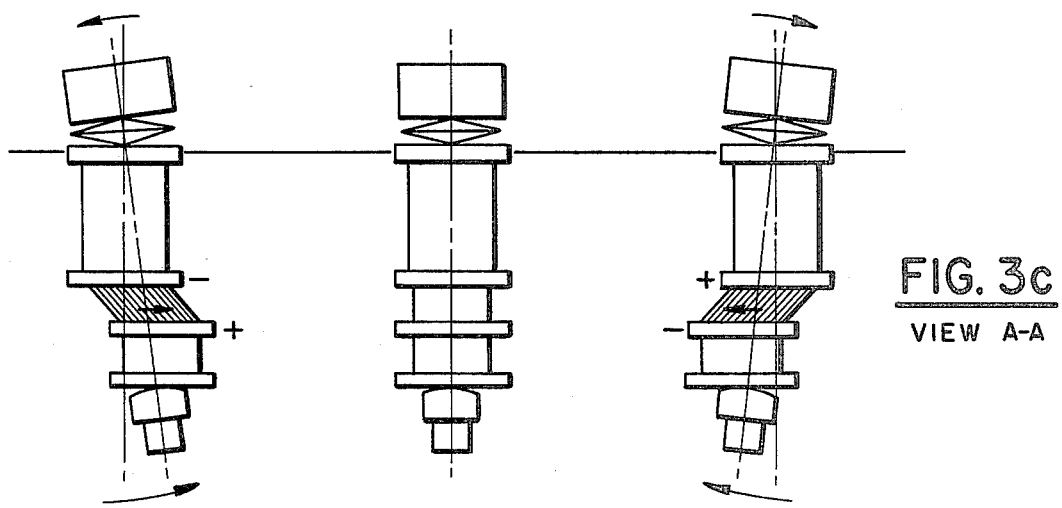
FIG. 3c is a diagrammatical representation taken along A—A of a mirror element showing tilt motion.

The compliant joint 16 comprises a flexure of frusto-conical configuration for connecting the mirror substrate 24 with a support structure 18 common to all mirror element assemblies 12. The reduced spring rate of this section permits the mirror substrate 24 to tip and tilt as well as move in and out, planar translation as shown in FIGS. 3a, 3b, and 3c when acted upon by the actuator assembly 22. Although the flexure of frusto-conical configuration such as a double "Belville" spring-type structure is preferred for the compliant joint 16, any compliant joint which will permit tip, tilt, and planar translation would be capable of performing the desired function.

Strut 20, composed of concentric tubes 30 and 32, connects the mirror substrate 24 with the aft face of the actuator assembly 22. Strut 20 is preferably connected to mirror substrate 24 prior to deposition of the coolant channel and manifold close-out layer and provides for both inlet and outlet coolant flow. Any conventional means for connecting strut 20 to substrate 24 can be used in the subject invention; however, brazing is preferred. Coolant enters the strut 20 through inlet tube 30 on the aft end of the strut 20. The inlet tube 30 is fed from an external manifold which is mechanically isolated from the segmented mirror structure to reduce manifold-associated mechanical, acoustic, and thermal perturbations. Inlet coolant flows in the outer annulus within the strut 20 to the substrate distribution manifolds providing thermal stabilization of the strut length. The heated outlet coolant flows through the centrally located tube 32.

A combination of nonconcentric rings 34, 36 and a nut 38 located at the juncture of strut 20 and actuator 22 provide static tip and tilt and in-plane gross adjustment of each mirror element 14. This feature significantly reduces fabrication tolerances enabling each element 14 to be precisely aligned on assembly. Micropositioning during operation is achieved by applying D.C. voltages to the actuator 22. The nut 38 also provides a means of properly preloading the strut 20 to a load value safely above the maximum required actuator force. As a result of this preload, the actuator 22 and strut 20 assembly will behave like a continuous structure without hysteresis or backlash. In a preferred configuration, two pairs of common coolant inlet and outlet manifolds supply coolant to connecting tube manifolds. The connecting tubes provide the compliance necessary to permit actuator motion. This arrangement prevents manifold vibration and pressure deflections from being transmitted to the optical structure. The coolant manifolds are dynamically isolated from the mirror mount interface by energy absorbing mounts.

Each mirror element 14 is driven by a piezo ceramic actuator 22 comprised of two sections. The forward section 40 includes a stack of wafers polarized in a direction parallel to the strut 20. Voltages applied to this section produce in-plane translation of the mirror surface 26.

The aft section 42 is composed of tilt actuator wafer 45 and tip actuator 47 polarized in a direction perpendicular to the strut axis. Polarization directions are oriented 90° apart in alternate wafers. Voltages applied to this section 42 cause shear strains in the stack, displacing the aft end of the actuator 22 with respect to the base. The corresponding displacement of the strut 20 produces tip and tilt of the mirror surface 26 about a gimbal point in the center of the compliant joint 16.

The supporting structure 18 is polished and covered with a reflective coating such as a beryllium plate and is machined to accept the compliant joint bases and threaded ends of the actuators. The forward surface is grit-blasted and gold-plated to diffuse and reflect incident laser energy. The plate is cooled by conduction into the bases of the cooled elements. Although the beryllium-treated plate is preferred, other surface treatments such as polished aluminum for lower incident power levels will also provide the desired effect.

The ability of the mirror 12 to compensate for deflections of the supporting structure 18 greatly reduces structural rigidity and stability requirements for the supporting structure and mirror mount. This feature is particularly important in large mirrors. In addition, the thermal response, i.e., time required to stabilize the optical figure, for this concept is very fast, on the order of 0.25 seconds, and is independent of mirror size by virtue of the segmented design. This feature improves system efficiency and response and again becomes increasingly evident in large mirrors.

Obviously, many modifications and variations of the present invention are possible in light of the above teachings. It is, therefore, to be understood that, within the scope of the appended claims, the invention may be practiced otherwise than as specifically described.

What is new and is desired to be secured by letters patent of the United States is:

1. An active segmented mirror for making static and dynamic wavefront corrections, comprises:
   a plurality of mirror element assemblies, wherein each of said assembly further comprises:
   a mirror surface;
   a cooled mirror substrate, for supporting said mirror surface;
   a complaint joint, connecting said mirror substrate with a support structure for permitting tip, tilt and planar translation;
   a strut connecting said mirror substrate with an actuator assembly for providing coolant passages;
   an actuator assembly, connected through said strut to said mirror substrate for driving said mirror element; and a support structure for mating said mirror element assemblies.

2. The active segmented mirror of claim 1, wherein said mirror substrate further comprises cooling passages and distribution manifolds for providing thermal management of power absorbed between said elements and power absorbed on said mirror surface.

3. The active segmented mirror of claim 2 wherein said mirror substrate further comprises the upper portion of said compliant joint.

4. The active segmented mirror of claim 1 wherein said compliant joint is a flexure of frustoconical configuration for permitting tip, tilt, and planar translation of said mirror element.

5. The active segmented mirror of claim 1, wherein said strut comprises:
   a plurality of concentric tubes connecting said mirror substrate to the aft end of said actuator; and
   a plurality of nonconcentric rings and an adjustment nut located at the juncture of said strut and said actuator for providing static tip, tilt, and in-plane gross adjustment for each of said mirror elements.

6. The active segmented mirror of claim 5 wherein said concentric tubes comprise a centrally located hot fluid outlet and an exterior cooling fluid inlet.

7. The active segmented mirror of claim 1 wherein said actuator assembly is a piezo ceramic actuator.

8. The active segmented mirror of claim 7, wherein said piezo ceramic actuator comprises:
   a forward stack of wafers polarized in a direction parallel to said strut, for producing in-plane translation; and
   an aft section of wafers polarized in a direction perpendicular to said strut, wherein said aft section of wafers is polarized 90° apart in alternating wafers, for providing tip and tilt about the gimbal point in the center of the compliant joint.

9. The active segmented mirror of claim 1 wherein said support structure comprises a plate for accepting the aft end of said compliant joint.

10. The active segmented mirror of claim 9 wherein said plate is beryllium.

11. The active segmented mirror of claim 9 wherein the forward surface of said support structure is gold-plated.

* * * * *

UNITED STATES PATENT AND TRADEMARK OFFICE
CERTIFICATE OF CORRECTION

PATENT NO. : 4,202,605
DATED : May 13, 1980
INVENTOR(S) : Theodore A. Heinz

It is certified that error appears in the above—identified patent and that said Letters Patent is hereby corrected as shown below:

Column 5, line 28, delete "complaint" and insert
-- compliant --.

Signed and Sealed this

Twenty-ninth Day of July 1980

[SEAL]

Attest:

SIDNEY A. DIAMOND

Attesting Officer

Commissioner of Patents and Trademar